United States Patent [19]
Li et al.

[11] Patent Number: 6,151,685
[45] Date of Patent: Nov. 21, 2000

[54] SYSTEM AND METHOD FOR RECOVERING A SEGMENT DIRECTORY FOR A LOG STRUCTURED ARRAY

[75] Inventors: Juan Li; Dung K. Nguyen, both of San Jose; Mien Shih, Saratoga; Hai-Fang Yun, San Jose, all of Calif.

[73] Assignee: International Business Machines Corporation, Armonk, N.Y.

[21] Appl. No.: 09/079,868

[22] Filed: May 15, 1998

[51] Int. Cl.[7] .................................................. G06F 11/00
[52] U.S. Cl. .............................................. 714/6; 711/114
[58] Field of Search .................................. 714/6, 2, 7, 8, 714/13, 20, 25, 27, 32, 39, 41, 42, 44, 54, 5, 43, 48, 770, 771; 395/463, 441, 600; 711/111–114, 115, 133, 136; 710/61, 52

[56] References Cited

U.S. PATENT DOCUMENTS

| | | | |
|---|---|---|---|
| 3,806,716 | 4/1974 | Lahti et al. ............................... | 235/153 |
| 4,598,357 | 7/1986 | Swenson et al. ......................... | 364/200 |
| 4,775,932 | 10/1988 | Oxley et al. .............................. | 364/200 |
| 4,945,474 | 7/1990 | Elliott et al. .............................. | 364/200 |
| 4,989,134 | 1/1991 | Shaw ........................................ | 364/200 |
| 5,034,914 | 7/1991 | Osterlund ................................. | 364/900 |
| 5,437,022 | 7/1995 | Beardsley et al. ........................ | 395/575 |
| 5,488,701 | 1/1996 | Brady et al. .......................... | 395/182.04 |
| 5,530,850 | 6/1996 | Ford et al. ................................ | 395/600 |
| 5,537,534 | 7/1996 | Voigt et al. ........................... | 395/182.04 |
| 5,551,003 | 8/1996 | Mattson et al. ........................... | 395/463 |
| 5,555,371 | 9/1996 | Duyanovich et al. ............... | 395/182.11 |
| 5,603,002 | 2/1997 | Hashimoto ............................... | 395/440 |
| 5,671,390 | 9/1997 | Brady et al. .............................. | 395/440 |
| 5,764,880 | 6/1998 | Gerdt et al. .......................... | 395/182.05 |
| 5,778,394 | 7/1998 | Galtzur et al. ........................... | 707/205 |
| 5,802,344 | 9/1998 | Mennon et al. .......................... | 395/492 |
| 5,835,938 | 11/1998 | Yamamoto et al. ...................... | 711/112 |
| 5,958,078 | 9/1999 | Yamamoto et al. ...................... | 714/766 |
| 5,996,054 | 11/1999 | Ledain et al. ............................ | 711/203 |
| 6,018,778 | 1/2000 | Stolowitz ................................. | 710/61 |
| 6,021,509 | 2/2000 | Gerdt et al. ................................. | 714/7 |

OTHER PUBLICATIONS

Patterson et al., A Case for Redundant Arrays of Inexpensive Disks (RAID), ACM SIGMOD 88, Jun. 1988, pp. 109–116.

Rosenblum et al., "The Design and Implementation of a Log Structured File System", Proceedings of the Thirteenth ACM Symposium on Operating Systems Principles, Oct. 13–16, 1991 Asilomar Conference Center.

Douglis et al., "Log–Structured File Systems", IEEE, Feb. 27–Mar. 3, 1989 Spring CompCon 89, 34th IEE Computer Conference.

*Primary Examiner*—Nadeem Iqbal
*Attorney, Agent, or Firm*—Esther E. Klein; Randall J. Bluestone

[57] ABSTRACT

In a storage system comprising an array of storage devices including a processor and memory, a plurality of data blocks are organized on the storage devices in segments striped across the storage devices. A main directory, stored in memory, contains the location on the storage device of each of the data blocks. For each segment a segment directory having information on the data blocks in the segment is stored on the storage devices. When a damaged segment directory is detected, a checkpoint of the main directory is written to the storage devices. A list is maintained of damaged segment directories such that segments on the damaged segment directories list are not garbage collected. Following a main directory recovery procedure, the damaged segment directories are reconstructed using the main directory.

19 Claims, 6 Drawing Sheets

LSA DIRECTORY (70)

| LOG VOL ID | LOG TRACK ID | SEG ID | SEG COLUMN | OFFSET | LENGTH | AGE | STATUS | ACTIVITY |
|---|---|---|---|---|---|---|---|---|
| VOL 2 | 200 | SEG 4 | COL 3 | 20 | 30 | 12345 | IDLE | 2/DAY |
| VOL 2 | 201 | SEG 26 | COL 8 | 1 | 5 | 21845 | G. C. | 1/HR |
| ⋮ | ⋮ | ⋮ | ⋮ | ⋮ | ⋮ | ⋮ | ⋮ | ⋮ |

75, 76, 71, 72, 73, 74, 78, 77, 79

SEGMENT DIRECTORY (80)

| SEG ID | TIME STAMP | # OF LTs |
|---|---|---|
| SEG 5 | 971112346 | 10 |

| LT # | LOG VOL ID | LOG TRACK ID | CURRENT DRIVE ID | LENGTH | OFFSET | PREVIOUS SEG ID | PREVIOUS COL ID | PREVIOUS OFFSET | PREVIOUS LENGTH |
|---|---|---|---|---|---|---|---|---|---|
| 1 | VOL 5 | 1000 | D1 | 200 | 40 | S30 | D2 | 10 | 20 |
| ⋮ | ⋮ | ⋮ | ⋮ | ⋮ | ⋮ | ⋮ | ⋮ | ⋮ | ⋮ |
| 100 | VOL 50 | 40 | D8 | 40 | 10 | S1 | D4 | 400 | 40 |

85, 86, 88, 87, 89, 90, 92, 93, 91

SEGMENT STATUS LISTING (94)

| SEG ID | STATUS | TIME STAMP | OCCUPANCY |
|---|---|---|---|
| SEG 1 | OPEN | | |
| SEG 2 | CLOSED | 922345 | 900 |
| ⋮ | ⋮ | ⋮ | ⋮ |
| SEG n | | | |

97, 98, 99, 100

CLOSED SEG LIST (101)

| SEG 4 | 10 |
|---|---|
| SEG 200 | |
| ⋮ | |

102, 103

DAMAGED SEGMENT DIRECTORY LIST (104)

SEGMENT 2
⋮

SYSTEM AND METHOD FOR RECOVERING A SEGMENT DIRECTORY FOR A LOG STRUCTURED ARRAY

FIELD OF THE INVENTION

This invention relates to a storage system comprising an array of storage devices where data blocks are stored and arranged as a log structured array. More particularly, this invention relates to recovering a segment directory containing information on data blocks stored in a segment of a log structured array.

BACKGROUND OF THE INVENTION

A disk array is a collection of hard disk drives (HDDS) managed as a unit. Disk arrays can provide better data I/O rate and data availability for application programs than single large capacity disks.

In "A Case for Redundant Arrays of Inexpensive Disks" report no. UCB/CSD/87/391, December 1987, Patterson et al. defined five levels of RAID. In each RAID level, redundant information is provided so that if one of the HDDs is unavailable, the data on that HDD can be reconstructed from one or more of the other HDDs in the array. RAID-1, often referred to as disk mirroring or data duplexing, stores identical images of user data on two or more member HDDS. In the RAID level 3, 4 and 5 systems, redundancy is provided using parity data.

In RAID level 4 and 5 systems, blocks of data are stored on each HDD in the array, and parity is calculated based on a group of blocks of data on each disk drive. A parity stripe or segment consists of a set of corresponding data blocks on each disk drive and a parity block calculated from those data blocks. Data can be striped at many levels, by blocks, tracks, multiple tracks, cylinders, and so forth. In RAID-5, parity is rotated amongst all the disk drives which makes the workload on the disks in the array uniform. Other RAID levels are also known including RAID-0 where data is striped on a set of HDDs but the array does not include any parity or other redundant information.

Customers of storage arrays are most concerned with reliability, access times, and cost per megabyte of data stored. RAID systems provide a way of addressing the reliability issue and access requirements. Access time is improved by caching data. A cache is a random access memory often included as part of a storage subsystem to further increase the I/O speed. A cache stores information that either has recently been requested from the disk or that needs to be written to the disk.

Data compression techniques provide a solution for improving the cost per megabyte of data storage. However, there are problems with implementing compression in RAID systems where data is always stored in the same location (home address) even after it continues to be modified. Although a good compression algorithm yields space savings in general, the amount of compression achieved is dependant on the actual data values. After a piece of data is updated it may not compress as well as it did before it was updated so it may not fit back into the space that had been allocated for it before the update. This creates a problem for any storage system where data is assigned a home address.

In a RAID level 5 system, parity information is updated for a write operation from the logical combination of the old data, the new data, and the old parity. While RAID-5 provides many benefits for increasing concurrent accesses, a write penalty is incurred. Rather than only having one array access for writing the new data, a write operation in RAID 5 requires four array access operations, for reading the old data, reading the old parity, writing the new data and writing the new parity.

In Rosenblum et al, "The Design and Implementation of a Log Structured File System", Proceedings of the 13th ACM on Operating System Principles, October 1991, a log structured file system was proposed where modified data blocks are re-written to the disk sequentially in a log-like structure. Information for managing the system is also written with each write operation.

A log structured array (LSA) uses some of the same principles of a log structured file in an array system. There are many benefits to using an LSA over a home address based RAID system. An LSA can accommodate the size changes in data produced through data compression since data is not given a fixed location on the disk. Therefore, in an LSA, data can be stored on disks in a compressed form. Also, since an LSA writes all modifications to disk sequentially in a log like structure, it solves the RAID-5 write penalty problem described previously. There is no longer a need to read the old data and old parity, since data blocks for an entire segment are written together.

Application programs and system software running on a host computer read and write data blocks using logical devices independent of the physical location of the data on the storage device (such as an HDD). Programs access data blocks from the storage system using logical cylinder, logical head, and logical record addresses. The storage system controller translates the logical address to the physical address at which the data block is stored. The host computer is unaware of the manner in which requested data blocks are stored on and accessed from the physical storage devices. The typical unit of data management within the controller is a logical track. A combination of a logical cylinder and logical head address represent the logical track address.

Figure 2:
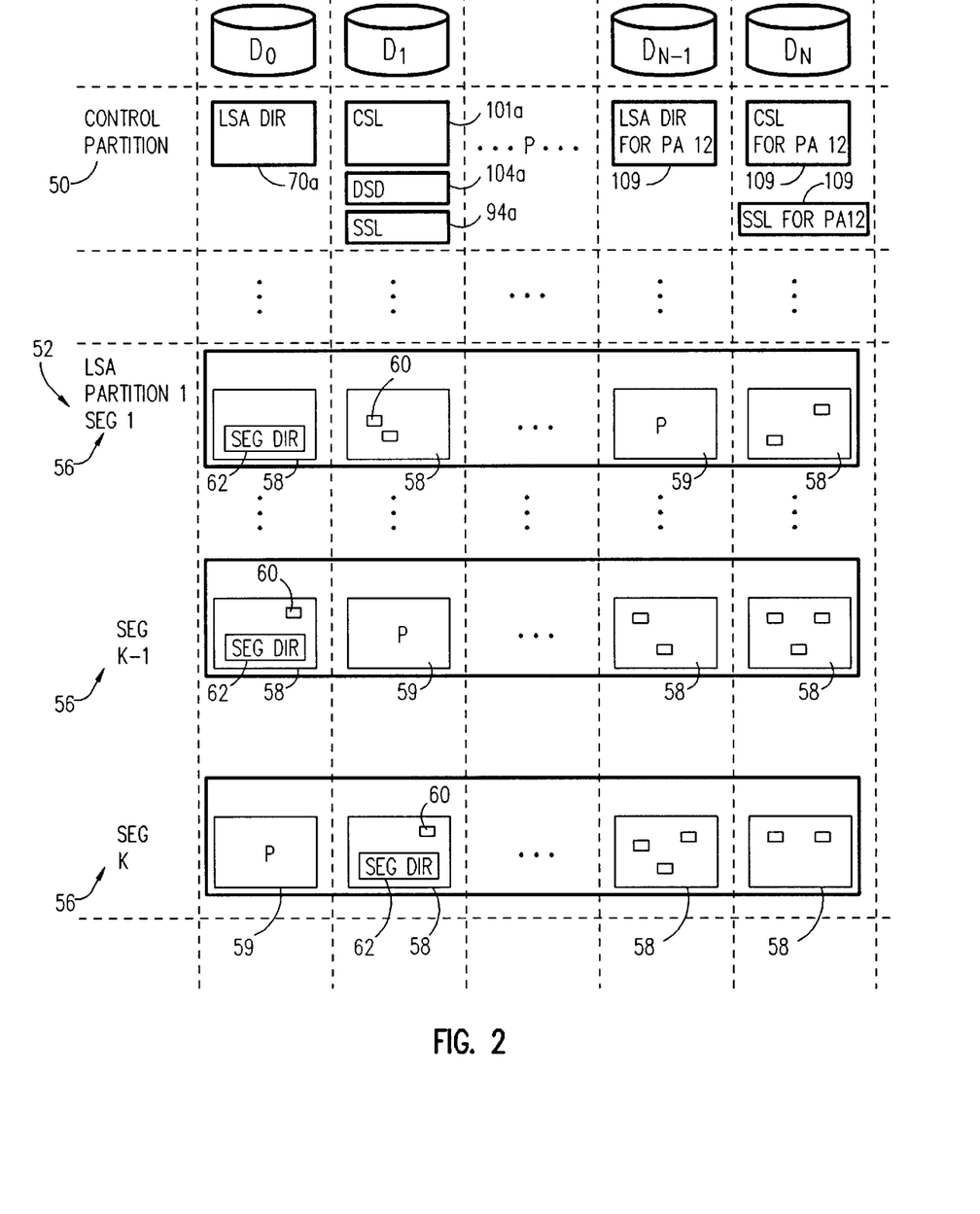
FIG. 2 is a representation of a layout of data blocks in segments on a disk array according to the preferred embodiment of the invention.

The log structured array consists of N+P+S physical disk drives where N is the number of HDDs worth of physical space available for customer data, P is the number of HDDs worth of space used for parity data, and S is the number of spare HDDS provided. Each HDD is divided into groups of consecutive sectors called segment columns. Typically, a segment column is as large as a logical cylinder. Corresponding segment columns from the N+P+S HDDs constitute a segment. The array has as many segments as there are segment columns on a HDD in the array. An example of the layout for such a system is shown in FIG. 2. In a RAID-5 configuration, one of the segment columns of a segment contains the parity of the remaining data segment columns of the segment.

In an LSA, data blocks such as logical tracks are updated to different locations on the disks. Since, in an LSA, the location of a logical track changes over time, a directory called an LSA directory has an entry for each logical track providing its current location in the disk array.

LSA segments are categorized as one of the following: FREE, meaning the segment contains no valid data and is ready to be opened; OPEN, meaning the segment is available to hold logical tracks being written to the disks ("destaged")and is in the process of being filled with logical tracks being destaged; CLOSING, meaning the segment contains some valid data, but no destage data can be further assigned to it and it is in the process of being closed and written to the disks; and CLOSED, meaning all of its data has been written to the disks.

The logical tracks in a logical cylinder may be destaged (written to disk) together to enhance the performance of a sequential access. A logical cylinder is called a "neighborhood." Other groupings of logically sequential data may also be categorized as a neighborhood. A group of logical tracks in a logical cylinder destaged together is called a "neighborhood in destage."

Destaging a neighborhood involves assigning it to an open segment. The open segment remains available to accept other neighborhoods in destage until it is deemed full enough to close. All of the data blocks and parity that constitute a segment are written to disk before the segment is considered closed. Each logical track in the open segment has an entry in the segment's segment directory that describes the track's location in the segment. The segment directory is written on the disk as part of the segment at segment closing time.

Closed LSA segments written to the storage device have "live" tracks and "holes." Live tracks are tracks that have not been updated since being assigned to the segment and contain current, valid data. Holes refer to the space vacated by tracks that were assigned to the segment but subsequently were updated and assigned to a different open segment, as well as fragmented space which was left vacant at the time the segment was closed.

Garbage collection is the process of reclaiming "holes" in closed segments on the storage devices. A garbage collection procedure is started when the number of free segments falls below a threshold. The process of garbage collecting a segment involves reading the segment's directory from disk and scanning each directory entry and comparing the track's address as indicated by the entry with the address as indicated by the corresponding LSA directory entry. If the two entries match, then the track still resides in the segment and is considered "live." All live tracks are then read from the disk into the memory and are written back to disk in other segments. Segments that were garbage collected become free (or available) segments.

While a RAID-5 disk storage system with one drive of parity data can protect against data loss from one disk drive, sometimes data can still be lost. If two corresponding sectors of data on two drives are damaged, both sectors are lost even though both drives are still operational.

In the case that a lost sector happens to contain segment directory data, rather than regular data, the impact is greater. In the event a failure or error occurs that corrupts or obliterates the contents of a main LSA directory, a customer may lose data without knowing which piece of data is lost or knowing that data is lost at all. When the main LSA directory is lost, segment directories are required to recover the main LSA directory. If a segment directory is not available, the main LSA directory cannot be recovered.

In addition, a segment directory is also used in the garbage collection process. A segment directory with a lost sector (a "damaged segment directory") will prevent the segment from being garbage collected and reused. The segment cannot be garbage collected because the segment directory is needed to validate the logical tracks in the segment as being live by comparing the segment directory entries to the main LSA directory entries. As a result, the disk space utilization is reduced because the segment space can not be reclaimed through garbage collection. Further, without knowing the fact that there is lost data in the segment directory, an effort may be made repeatedly to try to include the segment in the garbage collection procedure only to stop the garbage collection on the segment after failing to read the segment directory.

One or more of the foregoing problems is solved, or one or more of the foregoing goals is achieved in using the current invention.

SUMMARY OF THE INVENTION

It is an object of this invention to provide a way of recovering a damaged segment directory efficiently.

It is a further object of this invention to provide a way of preventing a segment having a damaged directory from being selected for garbage collection before the segment directory is recovered.

It is a further object of this invention to eliminate the loss of data without knowing which piece of data is lost that can occur when trying to recover a main LSA directory using a damaged segment directory.

In a storage system comprising a processor, memory, and an array of storage devices (such as HDDS), a plurality of data blocks (such as logical tracks) are organized on the storage devices in segments striped across the storage devices. When a block of data in a segment stored on the storage device in a first location is updated, the updated data block is assigned to a different segment and written to a new storage location. The data block in the first location is designated an old data block. The data block in the new location is designated a current or valid data block. A main LSA directory is stored in the memory. The main LSA directory contains the location on the storage devices of each of the current data blocks. A plurality of segment directories are stored as part of each segment, each containing information about the data blocks stored in that segment.

A system and method are provided for managing and recovering an LSA system having a damaged segment directory. A list identifying damaged segment directories is maintained in memory and on disk. The main directory is written to the storage devices when a damaged segment directory is detected. Using the main directory, the data blocks in each segment listed on the damaged segment directories list are identified and their corresponding segment directory entries are reconstructed. After the segment directory is reconstructed, it is removed from the list of damaged segment directories. The reconstructed segment directories are used in a space reclamation procedure wherein space in the segments containing old data are reclaimed and current data in each segment is written to a different segment.

Preferably, redundancy information, such as exclusive OR (XOR) parity information, is stored with each segment and is used to reconstruct the data blocks in the segment in the event a data block stored on a storage device is damaged.

In a further preferred embodiment an article of manufacture is provided for use in storing and managing a plurality of sets of data blocks in a computer system having a processor, memory and a group of storage devices, wherein each set of data blocks is stored in a segment striped across the group of storage devices. The article of manufacture has a computer program code embodied in said medium which causes the computer system to perform steps for recovering a damaged segment directory efficiently, for preventing the damaged segment directory from affecting an LSA directory recovery, and protecting against a segment having a damaged segment directory from being selected for garbage collection.

DETAILED DESCRIPTION OF THE PREFERRED EMBODIMENT

Figure 1:
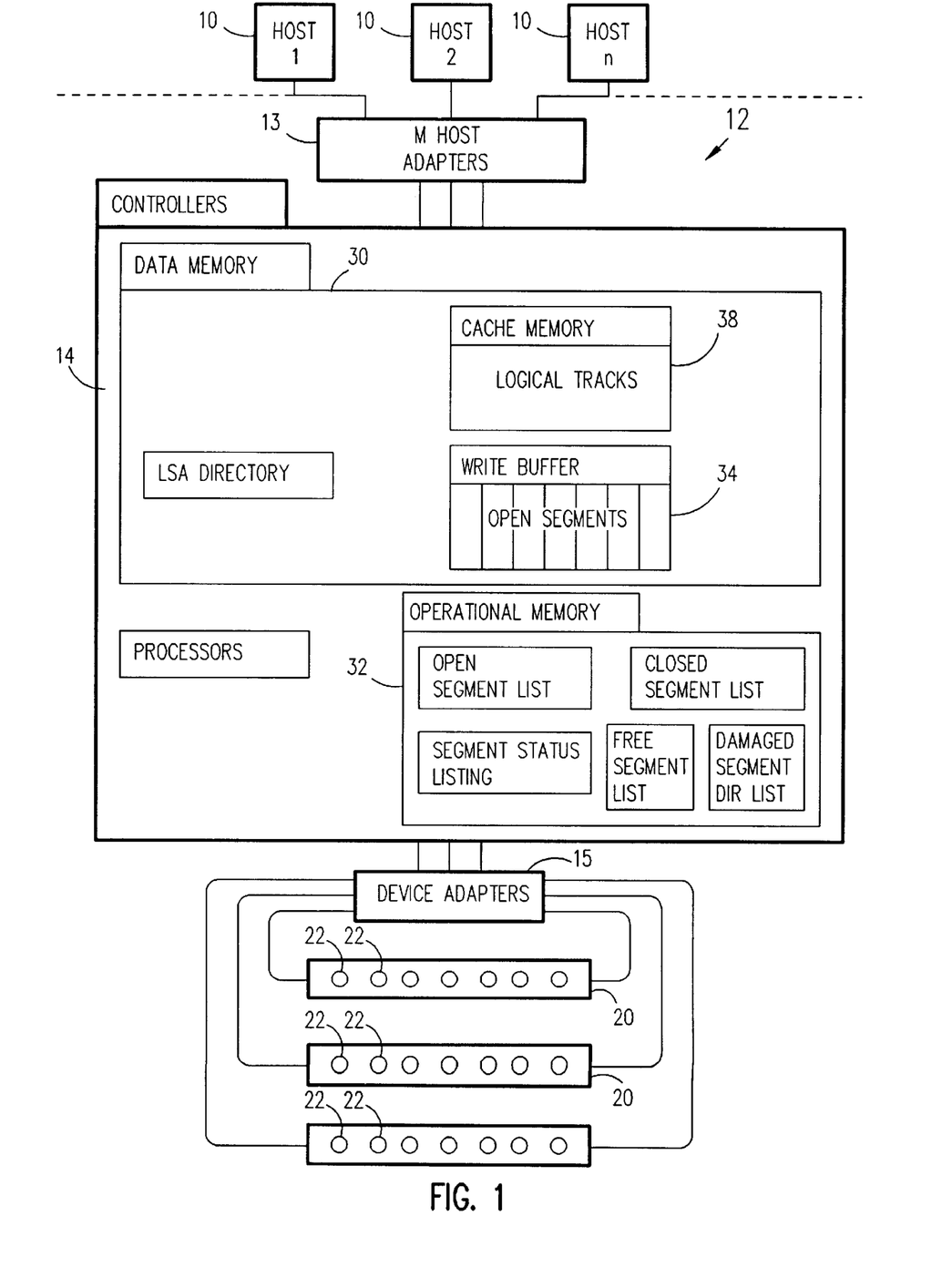
FIG. 1 is a block diagram of a computer system that includes a log structured array and array controller in accordance with the preferred embodiment of the present invention.

Referring to FIG. 1, one or more host processors 10 are connected to an external storage sub-system 12 through one or more host adapters 13. The storage subsystem 12 comprises the host adapters 13, the controllers 14, device adapters 15 and arrays of storage devices 20.

Preferably a multi-nodal data storage system is used. In a multi-nodal data storage system, a storage system controller has multiple nodes, each of the nodes may comprise, for example, an Intel model I960 microprocessor. The multi-processing nodes are interconnected in a torus ring configuration A lower interface (LI) node executes microcode that manages the disk arrays 16, including an LSA partition. The LSA subcomponent of the LI manages the LSA. A cache node manages the cache memory. The LI node and cache node can be the same physical entity, where microcode running at the same node performs both functions.

A pair of LI nodes can provide shared management. A first node may operate a series of storage devices 1 through 8, while a second would operate storage devices 9 through 16. In the event that the first node fails the second node can take over for the failed node and vice versa. The storage devices may be reassigned from one node to another to balance the nodes' workloads as well. Alternatively, each node is assigned exclusive control over a selected group of storage devices.

The controllers 14 are connected to the disk drives through one or more device adapters 15. Each device adapter communicates with at least one disk array 20 comprising a set of N+P+S disk drives 22. Preferably, each disk array is a separate parity group, or an integer number of parity groups, where the parity stored in the group of HDDs is used for reconstructing the data in that parity group.

Each host 10 comprises at least one processor which executes the system and application code, memory to hold system code, application code and data, and an I/O system responsive to Read and Write calls from executing applications for accessing information not in memory, from the external storage.

The present invention may be applicable to a variety of host computers running a number of different operating systems. The host computer may for example be a personal computer, a server, or a main frame computer. In addition, the computer may be a stand alone system or be a part of a network such as a local area network or a wide area network.

An example of a host system is the IBM System/370 or IBM System/390 running the IBM MVS operating system. Alternatively, the host system may be, for example, an IBM RS/6000 system running the IBM AIX operating system or any combination thereof. In an MVS system, the host processor creates a dedicated virtual processor for accessing and transferring data over a demand response interface to attached subsystems using chains of special purpose I/O instructions called channel command words (CCW). When an application program executes a Read or Write command requiring access to external storage such as disk storage, the MVS operating system issues a start I/O command. The start I/O command causes a CPU to suspend its multi-processing state, transfer data to the CCW chain, and reestablish its prior state after the CCW chain completion. The host sends a CCW chain to the controller over a path, such as the ESCON path or the serial storage architecture (SSA) path.

In an LSA system, the storage controller interprets each of the CCWs and responsively applies counterpart control and address signals over a path to an LSA directory to ascertain the location of data in the disk array.

The CPU within the LSA controller executes program instructions that are stored in the operational memory. These instructions may be loaded into the operational memory through an optional program storage reader. The invention may be implemented using any combination of computer programming software, firmware, or hardware. As a preparatory step in practicing the invention or constructing the apparatus according to the invention, the computer programming code, whether software or firmware, according to the invention will typically be stored in one or more machine readable storage devices, such as a fixed hard drive, diskette, optical disk, magnetic tape, semiconductor memory, such as ROMS, P-ROMS, etc., thereby making an article of manufacture according to the invention. The article of manufacture containing the computer programming code is used by either executing the code directly from the machine readable storage device, by copying the code from the storage device into another storage device such as a hard disk, RAM, etc. or by transmitting the code on a network for remote execution. The method form of the invention may be practiced by combining one or more machine readable storage devices containing the code according to the invention with appropriate standard computer hardware to execute the code contained therein. An apparatus for practicing the invention can be one or more computers in storage systems containing or having network access to computer programming code according to the invention.

With reference to FIG. 1, the controller for the LSA system includes data memory 30 and operational memory 32. The data memory includes a write buffer 34 (consisting of a number of open segments), an LSA directory and cache memory 38. The cache memory has substantially larger storage capacity than the write buffer. The cache memory may contain both "dirty" (updated) logical tracks, which are data modified by the host computer, and "clean" logical tracks, which are unmodified data, the same as the corresponding data on the HDDS.

When data is sent to a LSA storage system controller for storage, the data is compressed and stored in the cache memory where the data might remain for some time. The part of the cache that contains dirty data is typically battery protected such that it acts as a non-volatile store. When a portion of cache memory that is occupied by dirty tracks exceeds a predetermined threshold, then a dirty track and all logically adjacent tracks that are in the cache buffer are sent to the LSA subcomponent in the LI to be written to the storage devices. Often a storage system controller will also include a cache memory directory, which keeps track of most recently used and less recently used logical tracks.

While described with reference to HDDS, the invention is not limited to that type of storage device. A typical HDD 22 is a magnetic hard disk device which has multiple platters where data is recorded in concentric tracks on both surfaces of the platters. Conventionally the tracks are sequentially numbered from platter to platter within a single storage device. The first outer most track on a first platter is track 1.

A segment column is defined as an arbitrary number of contiguous tracks as described above. Typically it is desirable to define a segment column to be the same size as a logical cylinder. The collection of disk recording areas comprising corresponding segment columns from each of the HDDs forms what is called a segment.

The disk array storage space is divided into partitions. The controller creates a map representation of each partition, where each partition comprises a selected number of byte sectors, or tracks of each disk drive in the array. The controller receives a request to allocate from the storage area a number of storage partitions, which also can be thought of as logical volumes. These requests may originate from the user input device or the host computer application. Each request includes a size and a function mode for each storage partition. Based on the request, the controller operates each storage partition as a logical volume according to the requested function mode. In an illustrative embodiment the function modes may include LSA, home address (HA), non-RAID, and various levels of RAID.

Referring to FIG. 2, a layout of the disk system is shown where there are N+1 drives, where N is the number of data drives. The total disk space of N+1 drives is partitioned for example into a control partition 50 and LSA partition 52. In the LSA partition, the storage is arranged as segments 56, where each segment has N data segment columns 58 and one parity segment column 59. Logical tracks 60 are stored within data segment columns. A segment directory 62 is stored in a small number of sectors out of the a segment's total disk space. The entire segment directory is shown residing entirely on a single physical disk device. Alternatively, the segment directory can be spread among the devices. In a RAID-5 system, parity is distributed among the devices as shown. When an LSA partition is created its corresponding control partition is also created. The control partition is parity protected, but, is not log structured. Data stored in a control partition is updated in place.

Figure 3:
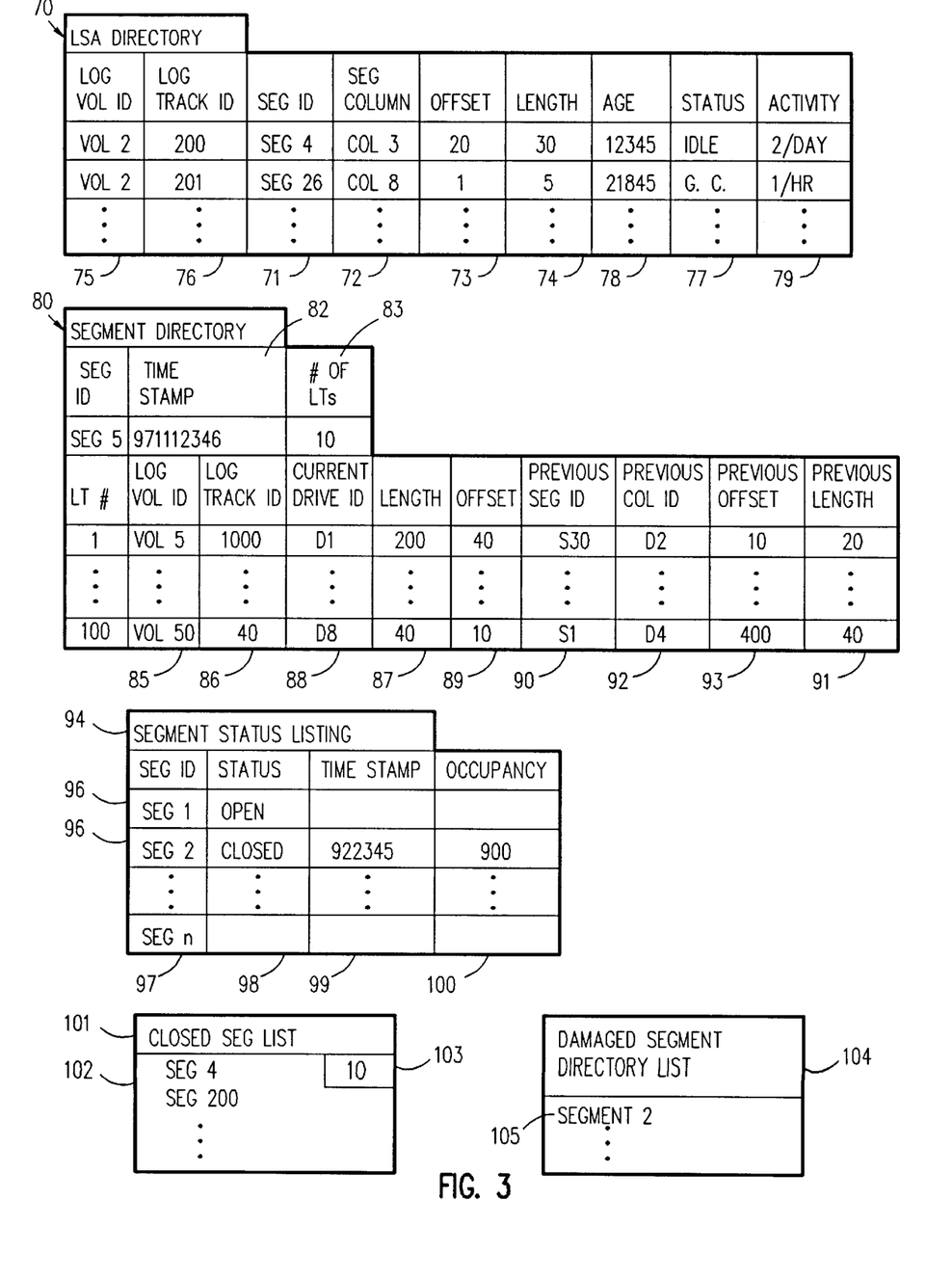
FIG. 3 is a representation of the control structures used in the preferred embodiment of the invention.

FIG. 3 illustrates data structures utilized by the LSA system. The LSA directory 70 has an entry for each logical track providing its physical address in an LSA partition. Each directory entry consists of the segment number 71, the segment column number 72 which is used to determine the drive ID, the offset within the segment column 73 in blocks, and the length of the logical track 74 in blocks. The LSA directory 70 is accessed using the logical volume ID 75 and the logical track ID 76 to provide a mapping to the physical storage location on the HDD, the drive ID and beginning block address (using the segment column and offset). Information on logical track status 77, on whether it is being staged (read from disk), destaged (written to disk) or garbage collected, when it was written (the age) 78 and frequency of accesses (activity) of the logical tracks 79 is also stored in the LSA directory.

A second LSA data structure is the segment directory 80, which resides in each of the segments. The segment directory contains a time stamp at segment closing 82, and the number of logical tracks in the segment at segment closing 83. For each of the logical tracks in that segment, the segment directory provides information on the logical volume ID 85, logical track ID 86, current length in blocks 87, current drive ID 88, current offset from beginning of the segment column 89, previous segment ID 90, previous length in blocks 91, previous drive ID 92, and the previous offset 93 from beginning of the segment column in blocks, where "current" refers to the time when the segment was closed and then written to disk.

Another data structure used by the LSA is the segment status listing (SSL) 94 which consists of elements 96 that describe the segments in a partition. The segment ID 97 is used as an index. Each element consists of the segment status 98, the time stamp at closing 99, and the occupancy 100, which is the sum of the lengths of the segment's live tracks. The SSL is scanned to identify segments for garbage collection with an occupancy below a threshold.

With reference to FIG. 3, the damaged segment directories list 104 records the segment numbers 105 of all the segments that have a damaged segment directories. A damaged segment directory is a segment directory stored on disk where one or more unreadable sectors of the directory cannot be reconstructed using RAID parity. The damaged segment directories list data structure is used for tracking which segments cannot be garbage collected and which segment directories need to be reconstructed.

With further reference to FIG. 3, the closed segments list 101 consists of the current list size 103 and the segment numbers of those segments that have been closed since the previous checkpoint 102.

Referring to FIG. 2, the portion of the disk array called the control partition 50 is reserved for storing a checkpoint of the LSA directory 70a, a checkpoint of the segment status listing 94a, the closed segments list 101a, and the damaged segment directories list 104a (as well as other control structures not described here).

Figure 4:
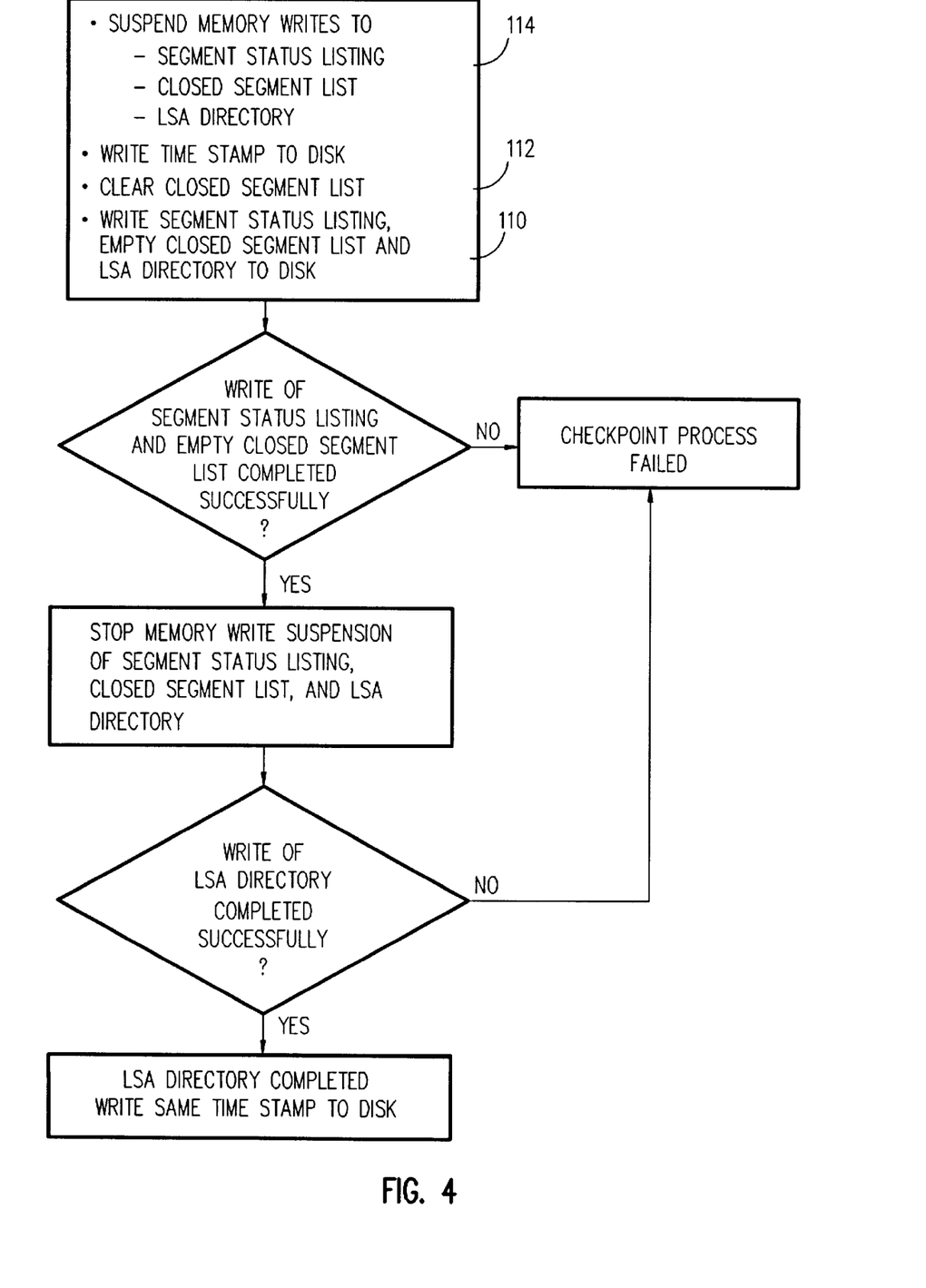
FIG. 4 is a flow diagram of the checkpoint process according to the preferred embodiment of the invention.

An overview of the checkpointing process used in recovering an LSA directory will be described with reference to FIG. 4. At regular intervals, measured by the number of segments that have closed since the last checkpoint, the LSA directory for a partition is written to the control partition. An empty closed segments list and a checkpoint of the SSL are also written onto the disks 112. A checkpoint threshold can be used to ensure that a maximum size of the closed segments list is not exceeded since the last checkpoint. The LSA directory is larger than a single memory unit, referred to as a page. Preferably, only the pages of the LSA directory that were modified since the last checkpoint are written to the control partition.

The newly written checkpoint now captures a consistent state of the LSA. The empty closed segments list indicates that no updates to the log have occurred since the checkpoint was taken.

When an open segment is closed, its segment number is appended to the closed segments list. The newly modified closed segments list 101 and its corresponding parity are then written to the control partition on the disk (101a in FIG. 2). If the closed segments list cannot be written to disk (hardened) successfully the segment cannot successfully complete its closing process. This means that the destage operation of all logical tracks that have been assigned to the segment are considered to have failed.

As part of the segment closing procedure the newly closed segment occupancy and closing time are recorded in the appropriate segment status listing entry in memory.

To synchronize checkpointing with normal LSA activities, memory updates to the LSA directory, the segment status listing and the closed segments list are suspended while the segment status listing and an empty closed segments list are written to the disk as part of the checkpoint process 114. During this time only updates to the three data structures written to the control partition (the main LSA directory, the segment status listing and the closed segments list) are blocked. Other activities associated with destage operations such as assigning logical tracks to open segments, calculating parity and writing logical tracks on disk can proceed concurrently.

After the segment status listing and an empty closed segments list are safely stored on disk, updates to the control partition data structures are allowed. The writing of an LSA directory to disk can begin at the same time as that of the segment status listing and the closed segments list. The resumption of updates to the three data structures does not need to wait until the completion of the LSA directory checkpointing.

Figure 5:
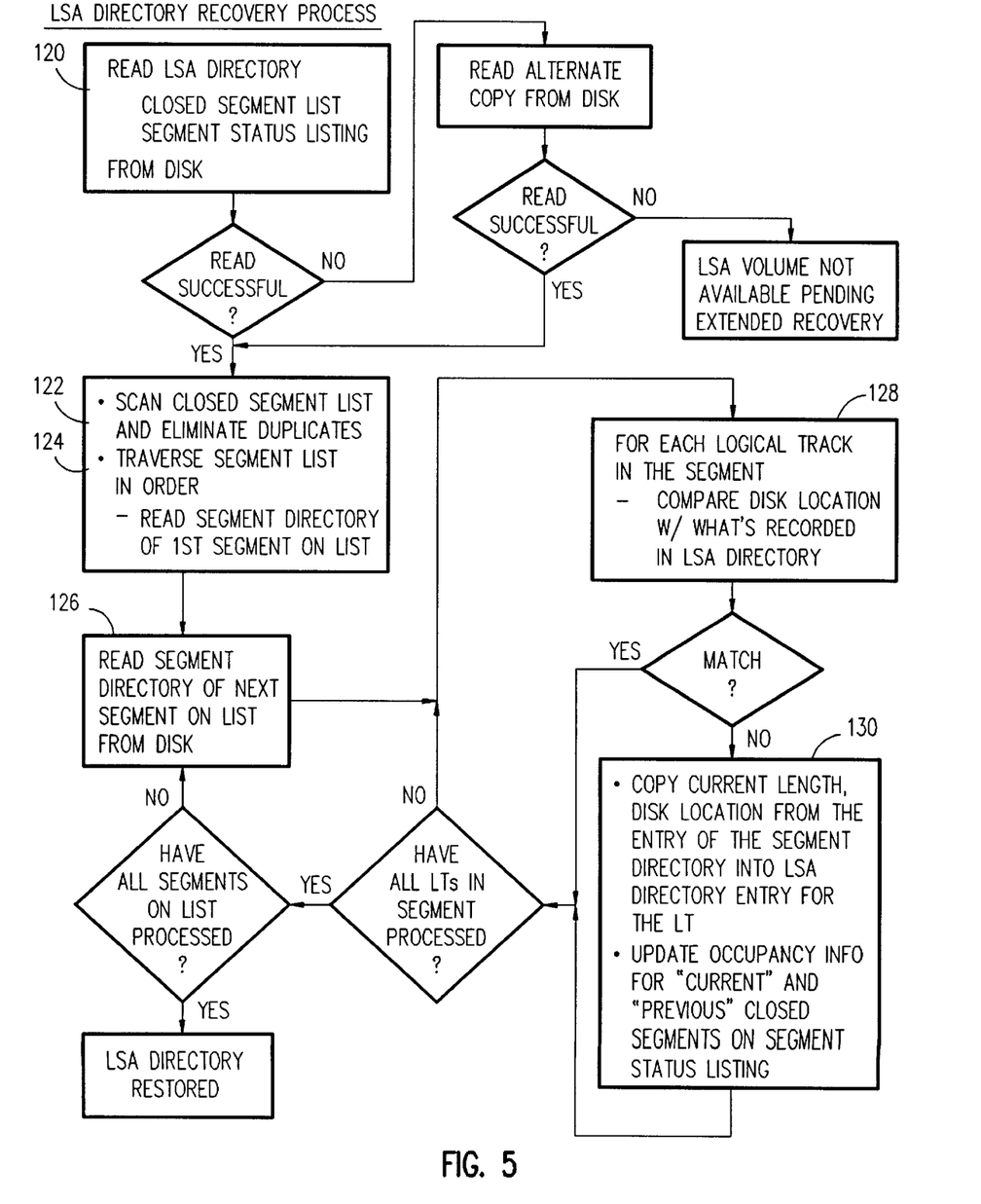
FIG. 5 is a flow diagram of the main LSA directory recovery process according to the preferred embodiment of the invention.

The LSA directory recovery process is described with reference to FIG. 5. In the event that any part of the LSA directory is corrupted in main memory, the directory may be reconstructed as follows. The disk copies of the LSA directory, closed segments list and segment status listing are read into main memory 120 where the just read LSA directory reflects what was written during the most recent checkpoint and serves as the base copy in the recovery. The closed segments list keeps information on the changes after the most recent checkpoint and is used to update the base copy of the LSA directory to make it up to date. The segment status listing read from the disks is used to recover the segment occupancy information needed in memory in order for the LSA to be ready to take destage requests again.

The closed segments list is first scanned for any duplicate segment numbers 122. If a segment number appears multiple times on the list, only the entry nearest the end of the list is kept. The resulting closed segments list is traversed in order 124. For each segment number listed, the segment directory is read from the device into memory 126. Each segment directory entry describes the location to which a logical track was written when it was assigned to that segment. For each segment directory entry the logical track's current address is compared to its address as recorded in the LSA directory entry 128. If the addresses differ, then the logical track's current length and current disk address as described in the segment directory entry are copied into LSA directory entry 130. The logical track's previous segment number and length also recorded in the segment directory entry are used to readjust the previous segment's occupancy in the segment status listing. If the addresses are the same than no further processing is required for that segment directory entry.

Referring again to FIG. 2, further redundancy is built in for this checkpointing process to protect against more than a single disk failures. Two or more simultaneous disk or sector failures in the control partition occurring while writing a checkpoint will leave the control partition in an inconsistent state. Therefore two different disk areas in two different disk arrays (parity groups) are allocated for the checkpoint data structures, with each area holding an independent copy of the data structures. Each area is marked with a time stamp that is written twice, once at the start of the checkpoint process and once at the end of the process (with the same timestamp). Matching time stamps within an area indicate the checkpoint completed successfully. As shown in FIG. 2, control structures 109 from an LSA in another parity array (for example PA12) are also stored in the control partition of this parity array.

The checkpoint writing is alternated between the disk arrays. At the recovery time, the time stamps are used to determine which copy of the control partition data structures to use.

Typically, a RAID-5 storage subsystem will perform background scans of each sector on the storage devices by trying to read the data and verifying that the data is correct. If a sector is unreadable, it can be reconstructed using the parity data. In a RAID 5 system having only one parity segment column per parity stripe, if two corresponding sectors in the same parity stripe or segment cannot be read, the data is unavailable in both sectors and is considered "lost." In what is referred to as a RAID-6 system there are two parity segment columns per segment, so that two corresponding unavailable sectors on two different HDDs can be reconstructed. While the chances of having a lost sector in a RAID-6 system are slim, this invention would still apply. Likewise, this invention would apply to any system where one or more sectors of a segment directory is lost.

Figure 6:
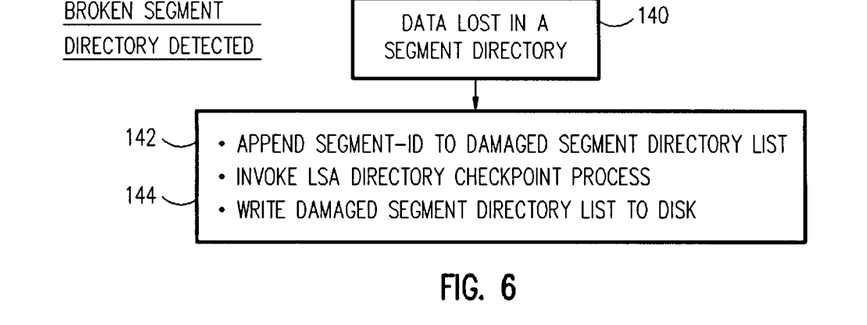
FIG. 6 is a flow diagram of the process followed when a damaged segment directory is detected.

The process followed when a damaged segment directory is detected is shown in FIG. 6. When a lost sector is detected and determined to hold segment directory data 140, the segment number is recorded in the damaged segment directories list 142 both in memory and on disk. At the same time, a checkpoint of the LSA directory is initiated 144. The memory copy of the damaged segment directories list is used to prevent the segment from being chosen for garbage collection, a process that involves reading the segment directory. The disk copy of the damaged segment directories list is mainly used for the segment directory recovery.

There are two main reasons for immediately checkpointing the LSA directories. The first reason is to prevent the LSA directory recovery-from-checkpoint procedure from possibly using the corrupted segment directory to reconstruct LSA directories. For example, a lost sector in a segment directory is detected in a segment that happens to be a newly destaged segment on the closed segments list. Should a system failure occur before the next checkpoint, the LSA directory recovery process uses the segment directory information of the segments on the closed segments list, including the one with the bad segment directory. Instead of taking the risk of failing to recover the LSA directory and losing data, it is important to take an immediate checkpoint of the LSA directory while the LSA directory is still intact. By doing this, the segment with the bad segment directory will not be on the closed segments list when the checkpoint completes and will no longer be needed for any possible LSA recovery. Therefore, the LSA directory and data tracked by the damaged segment directories are protected.

The second reason for immediately checkpointing the LSA directory after a lost segment directory is detected is to save the information needed for recovering the segment directory. As long as an LSA directory is available or recoverable, the information on all the valid logical tracks, including the ones that still reside in the segment with a bad segment directory, is kept and can be used to recreate the segment directory entries for the still live tracks in the segment.

The segment directory entries for the still live logical tracks within a damaged segment directory can be regenerated by scanning through the LSA directory, looking for LSA directory entries that indicate tracks still residing in that segment. Since this task is very CPU intensive, it is not desirable to do so during the normal operation of the I/O subsystem. Preferably, the recoveries of the segment directories on the damaged segment directory list are performed immediately following the LSA directory recovery during the recovery time. As long as the segments with damaged segment directories are tracked, so as to not be included in the garbage collection and the LSA directory recovery will not need these segment directories, there is no hurry in recovering the segment directories, except to free up space in the disk drives, since these segments can not be garbage collected. If these segments must be garbage collected, the segment directory reconstruction can be done independent of a LSA directory recovery.

Figure 7:
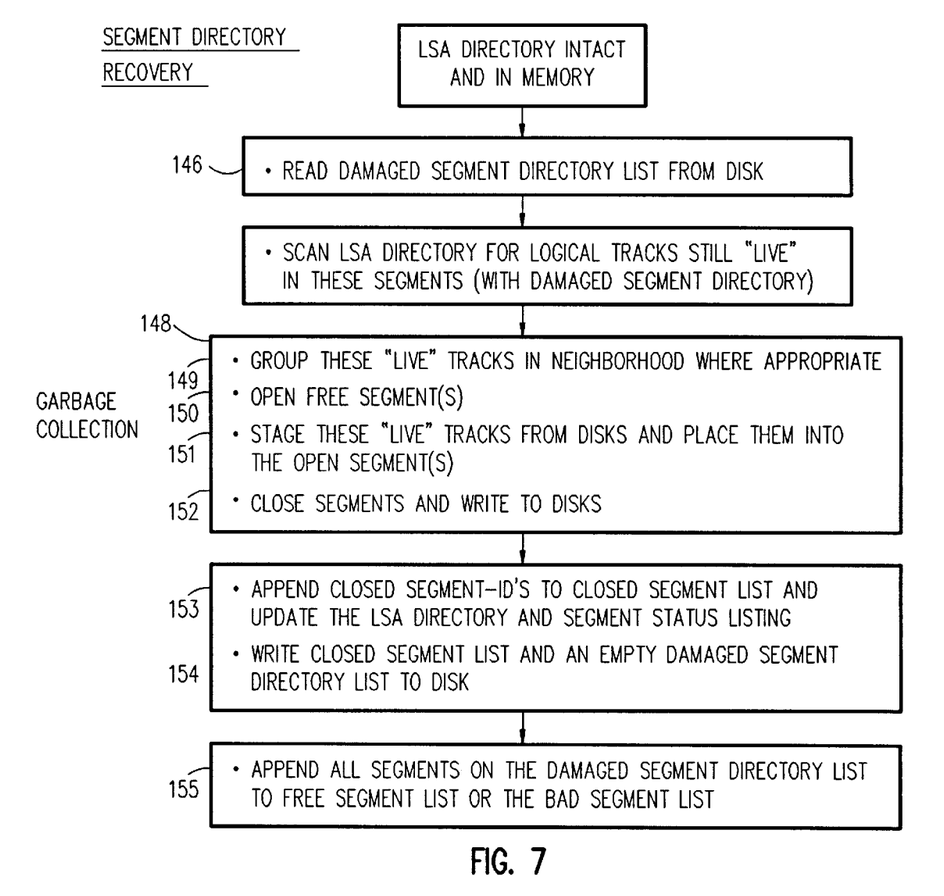
FIG. 7 is a flow diagram of the process for recovering damaged segment directories.

Referring to FIG. 7, as part of the LSA recovery procedures, the damaged segment directories list is read from disk 146 and, if it is not empty, for each listed segment, memory for its segment directory is allocated. After an LSA directory is reconstructed, each of its directory entries is checked to determine whether the entry's segment number is on the damaged segment directories list. If so, the entry is added to the appropriate segment directory.

After every segment directory has been reconstructed, all recovered segment directories contain all and only entries for those tracks still located in the corresponding segments. The reconstructed segment directories can then be written on disk at the appropriate location in each segment. The segment numbers of those segment directories successfully rewritten are removed from the damaged segment directories list, and the empty damaged segment directories list is written in the LSA control partition.

The storing of a reconstructed segment directory on disk is complicated by the fact that because the segment directory is part of a segment's data, it also contributes to the segment's parity, since the segment columns are exclusive ORed (XORed) to produce the parity. Thus, when the reconstructed segment directory is rewritten in a data segment column, the corresponding sectors on the parity segment column must also be rewritten. Where "n" is the segment depth, and "m" is the number of sectors in a segment directory, and assuming that the segment directory resides on sectors n-m though n-1 on a data segment column, rewriting the affected part of the parity segment column involves the following process steps:

1. allocate and zero memory for m sectors,
2. for each data segment column except the one containing the directory, read sectors n-m to n-1 and XOR those sectors with the m sectors of the recovered segment directory.
3. write sectors n-m to n-1 of the parity segment column.

In the preferred embodiment, instead of rewriting a recovered segment directory (and the corresponding parity), the segment is garbage collected in the background immediately 148. By the time that reconstruction of segment directories begins, all LSA control information has been restored in main memory and the log structured array can resume its normal operation. Therefore, beginning garbage collection at this point is possible.

In order to perform garbage collection, the LSA directory is scanned to identify live tracks in the segments on the damaged segment directories list. The live tracks are grouped into neighborhoods where appropriate 149. Free segments are opened to receive these live logical tracks 150. The live logical tracks are staged from the disk and assigned to the open segments 151. The segments are then closed and written to appropriate places on the disks 152. The closed segment IDs are added to the closed segments list and the LSA directory and the segment status listing are updated 153. The closed segments list and the empty damaged segment directories list are also written to the control partition 154. The segments listed on the damaged segment directories list are deleted from that list and added to the free segment list as long as the segment is useable 155. Otherwise, it is placed on a "bad segment" list to not be used.

As is well understood by those skilled in the art, there are alternative ways of indicating that a segment is unusable.

Using the reconstructed segment directories for a garbage collection procedure instead of writing the reconstructed segment directories back to the storage devices has several advantages. Disk accesses to read sectors on N-1 segment columns are eliminated. Also, the segment directory is already in memory and does not have to be rewritten by the recovery process, then later reread by the garbage collection process. Also, this compacts the LSA partition disk space following the LSA directory recovery before normal destage activities commences. Additionally, the normal LSA mechanisms are utilized in this step of the reconstruction process; no extra code needs to be written to perform the special parity calculation.

As has been described the present invention provides an improved system and method for managing and reconstructing a damaged segment directory. While the invention has been particularly shown and described with reference to a preferred embodiment it will be understood by those skilled in the art that various changes in form and detail may be made therein without departing from the spirit and scope of the invention.

We claim:

1. In a storage system comprising an array of storage devices, including a processor and memory, having a plurality of data blocks, designated as current data blocks and old data blocks, organized on the storage devices in segments striped across the storage devices, and a main directory, stored in the memory, containing the location on the storage devices of each of the current data blocks, wherein a segment directory is stored on the storage devices as part of each segment, the segment directory containing information on the data blocks stored in that segment, a method for managing and recovering a storage system having a damaged segment directory, comprising the steps of:

a) maintaining a list identifying the damaged segment directories;
    b) periodically writing the main directory to the storage devices;
    c) writing the main directory to the storage devices when a damaged segment directory is detected; and
    d) recovering the segment directories in memory by identifying the current data blocks in each segment listed on the damaged segment directories list using the main directory.

2. The method of claim 1 wherein step (d) is performed during a procedure for reconstructing a damaged main directory.

3. The method of claim 2 wherein the procedure for reconstructing a damaged main directory comprises the steps of:

reading the most recently checkpointed version of the main directory stored on the storage devices; and
    for each data block in a segment written to the storage devices after the checkpoint of the main directory was written to the storage devices, updating a corresponding entry in the main directory using information in a corresponding segment directory.

4. The method of claim 1 further comprising the step of:
    initiating a space reclamation procedure after step (d), the space reclamation procedure comprising the step of:
        assigning current data blocks from segments listed on the damaged segment directories list to a set of open segments.

5. The system of claim 1 wherein a portion of the storage devices is partitioned as a control partition and the latest version of the main directory, closed segments list, segment status listing, and the damaged segment directories list are written to the control partition.

6. A data storage system for storing electronic data for a data processing system, the data storage system comprising:

an array of storage devices, including a processor and memory, having a plurality of data blocks, designated as old data blocks and current data blocks, organized on the storage devices in segments striped across the storage devices;

a main directory, stored in memory, containing the location on the storage devices of each of the current data blocks;

a plurality of segment directories, each segment directory having information on the data blocks in a given segment;

a checkpoint of the main directory written to the storage devices periodically and also written when a damaged segment directory is detected; and a list identifying damaged segment directories, wherein segment directories on the damaged segment directories list are rebuilt using information in the main directory and wherein segments listed in the damaged segment directories list do not participate in space reclamation procedures.

7. The system of claim 6 wherein listed damaged segment directories are rebuilt when a damaged main directory is rebuilt.

8. The system of claim 7 wherein the current data blocks in the segments on the damaged segment directories list are written to the storage devices as part of different segments during a space reclamation procedure after the damaged segment directories are recovered.

9. In a data storage system comprising an array of storage devices, including a processor and memory, having a plurality of data blocks organized on the storage devices in segments striped across the storage devices, and each segment including parity information used to reconstruct the data blocks of the segment in the event a storage device is damaged, wherein when a data block in a segment stored on the storage devices in a first location is updated, the updated data block is written as part of a different segment to a new storage location, and is designated a current data block, and the data block in the first location is designated an old data block, and having a main directory, stored in memory, that keeps track of the location on the storage devices of each of the current data blocks, a system for recovering a segment directory that is stored with a segment, having information on the data blocks in the segment, in the event the segment directory is damaged, comprising:

means for maintaining a list identifying damaged segment directories;

means for periodically writing the main directory to the storage devices;

means for writing the main directory to the storage devices when a damaged segment directory is detected; and means for identifying current data blocks stored in each segment on the damaged segment directories list, and reconstructing a segment directory entry for each identified data block, during a procedure for reconstructing a damaged main directory.

10. The system of claim 9 further comprising:

means for assigning current data blocks from the segments listed on the damaged segment directories list to a set of open segments.

11. An article of manufacture for use in storing and managing a plurality of sets of data blocks in a computer system having a processor, memory and a group of storage devices, wherein each set of data blocks is stored in a segment striped across the group of storage devices, the article of manufacture having a computer program code embodied in said medium which causes the computer system to:

update a data block in a segment stored on the storage devices in a first location by writing the updated data block as part of a different segment to a new storage location, wherein the updated data block is designated a current data block, and the data block in the first location is designated an old data block;

maintain a main directory, stored in memory, that keeps track of the location on the storage devices of each current data block;

store on the storage devices, for each segment, a segment directory having information on the data blocks in the segment;

write the main directory to the storage devices at periodic intervals for use in a main directory recovery procedure;

write the main directory to the storage devices when a damaged segment directory is detected;

maintain a list identifying damaged segment directories; and reconstruct the damaged segment directories on the list of damaged segment directories using the information in the main directory.

12. The article of manufacture as claimed in claim 11 wherein the program code further causes the computer to:

identify segments to be recycled that have an occupancy value of current data blocks below an occupancy threshold value, wherein the segments on the damaged segment directory list are not included as identified segments to be recycled; and recycle segments to reclaim space when the number of available segments falls below an available segment threshold by writing the current data blocks in the identified segments to the storage devices as a part of a different segment, wherein the recycled identified segments are designated as available segments.

13. The article of manufacture as claimed in claim 11 wherein the program code further causes the computer to:

partition a portion of the storage devices as a control partition wherein the checkpoint directory, the damaged segment directories list, closed segments list, and segment status listing are written to the control partition.

14. The article of manufacture as claimed in claim 11 wherein the program code further causes the computer to:

read a most recently checkpointed version of the main directory stored on the storage devices; and for each data block in a segment written to the storage devices after the checkpoint of the main directory was written to the storage devices, update a corresponding entry in the main directory using information in a corresponding segment directory.

15. The method of claim 1 further comprising:

identifying segments to be recycled that have an occupancy value of current data blocks below an occupancy threshold value, wherein the segments on the damaged segment directory list are not included as identified segments to be recycled; and recycling segments to reclaim space when the number of available segments falls below an available segment threshold by writing the current data blocks in the identified segments to the storage devices as a part of a different segment, wherein the recycled identified segments are designated as available segments.

16. The system of claim 6 wherein to reconstruct a damaged main directory the system:

reads the most recently checkpointed version of the main directory stored on the storage devices; and for each data block in a segment written to the storage devices after the checkpoint of the main directory was written to the storage devices, updates a corresponding entry in the main directory using information in a corresponding segment directory.

17. The system of claim 6 wherein the system further:

initiates a space reclamation procedure after segment directories are recovered, the space reclamation procedure comprising assigning current data blocks from segments listed on the damaged segment directories list to a set of open segments.

18. The system of claim 6 wherein a portion of the storage devices is partitioned as a control partition and the latest version of the main directory, closed segments list, segment status listing, and the damaged segment directories list are written to the control partition.

19. The system of claim 9 wherein to reconstruct a damaged main directory the system:

reads the most recently checkpointed version of the main directory stored on the storage devices; and for each data block in a segment written to the storage devices after the checkpoint of the main directory was written to the storage devices, updates a corresponding entry in the main directory using information in a corresponding segment directory.

\* \* \* \* \*